United States Patent [19]
Momonani

[11] Patent Number: 5,767,984
[45] Date of Patent: Jun. 16, 1998

[54] FACSIMILE APPARATUS WITH PAPER CUTTER

[75] Inventor: Shinichi Momonani, Nara, Japan

[73] Assignee: Sharp Kabushiki Kaisha, Osaka, Japan

[21] Appl. No.: 768,135

[22] Filed: Dec. 17, 1996

[30] Foreign Application Priority Data

Dec. 20, 1995 [JP] Japan .................. 7-331660

[51] Int. Cl.$^6$ .................. H04N 1/31; H04N 1/32; G01D 9/00; B41J 11/70
[52] U.S. Cl. .................. 358/304; 358/468; 346/24; 400/621
[58] Field of Search .................. 358/304, 296, 358/400, 401, 468; 395/116; 399/406; 346/24; 400/621; 101/93.07, 224, 226, 227

[56] References Cited

U.S. PATENT DOCUMENTS

| | | | |
|---|---|---|---|
| 3,973,264 | 8/1976 | Costello et al. | 358/304 X |
| 4,115,817 | 9/1978 | Suzuki et al. | 358/304 X |
| 4,122,497 | 10/1978 | Suzuki et al. | 358/304 |
| 4,839,732 | 6/1989 | Murakami et al. | 358/304 |
| 5,257,114 | 10/1993 | Yoshida et al. | 358/304 X |
| 5,663,804 | 9/1997 | Kataoka et al. | 358/304 |

FOREIGN PATENT DOCUMENTS 7-143277  11/1993  Japan .................. H04N 1/00

Primary Examiner—Eric Frahm
Attorney, Agent, or Firm—Nixon & Vanderhye, P.C.

[57] ABSTRACT

A facsimile apparatus advances recording paper from a roll of recording paper (1) to a cutter (3) which cuts the paper to a length equal to the number of lines necessary for printing a single full page of an image. The facsimile apparatus has first through fourth individually-driven paper-fowarding devices. The cutter is located between the first (2) and second (4) paper-forwarding devices; a bend guard (5) is located between the second (4) and third (6) paper-forwarding devices; a printer (7) is located between the third (6) and fourth (8) paper-forwarding devices. A controller (16), using the paper-forwarding devices, causes the recording paper to bend between the cutter and the printer. Forwarding of the paper to the cutter is suspended at the moment the length of the recording paper which has passed the cutter is found to have reached the length equal to the number of lines necessary for printing a single full page of an image.

3 Claims, 4 Drawing Sheets

FACSIMILE APPARATUS WITH PAPER CUTTER

BACKGROUND OF THE INVENTION

1. Field of the Invention

The present invention relates to a facsimile apparatus which uses a roll of recording paper. Particularly, the invention relates to a facsimile apparatus which allows a roll of recording paper to be cut while printing thereon.

2. Description of the Related Art

Japanese Unexamined Patent Application Disclosure HEI 7-143277 discloses an electrophotographic recording system-based facsimile apparatus which is equipped with means for employing a roll of recording paper to utilize the recording paper efficiently, wherein the means comprises, as illustrated in FIG. 5, paper-forwarding means 100 for forwarding a length of recording paper which matches the length of an image to be printed which has been detected prior to initiation of printing, a downward cutter unit for cutting the recording paper forwarded by the paper-fowarding means 100, another paper-forwarding means 200 for forwarding the cut recording paper to a printer unit including a photoconductive drum, and a photographic fixing unit.

When printing is performed according to the method of the prior art described above, the distance between the cutter unit and the printer unit must be equal to or longer than the length corresponding to that of the document. Since the distance depends on the size of the apparatus, however, only images of up to a given length can be printed.

Further, an additional time is required for forwarding and cutting off a length of recording paper from the recording paper which matches the print area.

SUMMARY OF THE INVENTION

The present invention, which has been accomplished to overcome the problems described above, allows miniaturization of the apparatus and reduction in the control time.

The facsimile apparatus according to the invention comprises first detecting means for detecting the number of lines of a single full page of an image to be printed; storing means for storing the number of lines detected by the first detecting means; first paper-forwarding means for forwarding a roll of recording paper; a cutter for cutting the recording paper forwarded by the first paper-forwarding means, along a width thereof; second and third paper-fowarding means which are located between a printer for printing an image and the cutter, and capable of being individually driven; guarding means for guarding a bended portion of the recording paper; preventing means for preventing portions of the recording paper other than the bending-allowable portion from bending; second detecting means for detecting whether the length of the recording paper which has passed the cutter has reached the stored number of lines; and controlling means for causing the recording paper to bend between the cutter and the printer using the first, second and third paper-forwarding means prior to or while printing, suspending the forwarding of the paper to the cutter at the moment the length of the recording paper which has passed the cutter is detected to have reached the length necessary for printing the lines, and cutting the recording paper with the cutter for a shorter time than that required for printing on the bended portion of the recording paper.

The facsimile apparatus according to the invention is characterized in that the roll of recording paper is a roll of ordinary recording paper.

The facsimile apparatus according to the invention is characterized in that the means for guarding the bended portion of the recording paper and the preventing means for preventing portions of the recording paper other than the bending-allowable portion are rendered anti-static.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
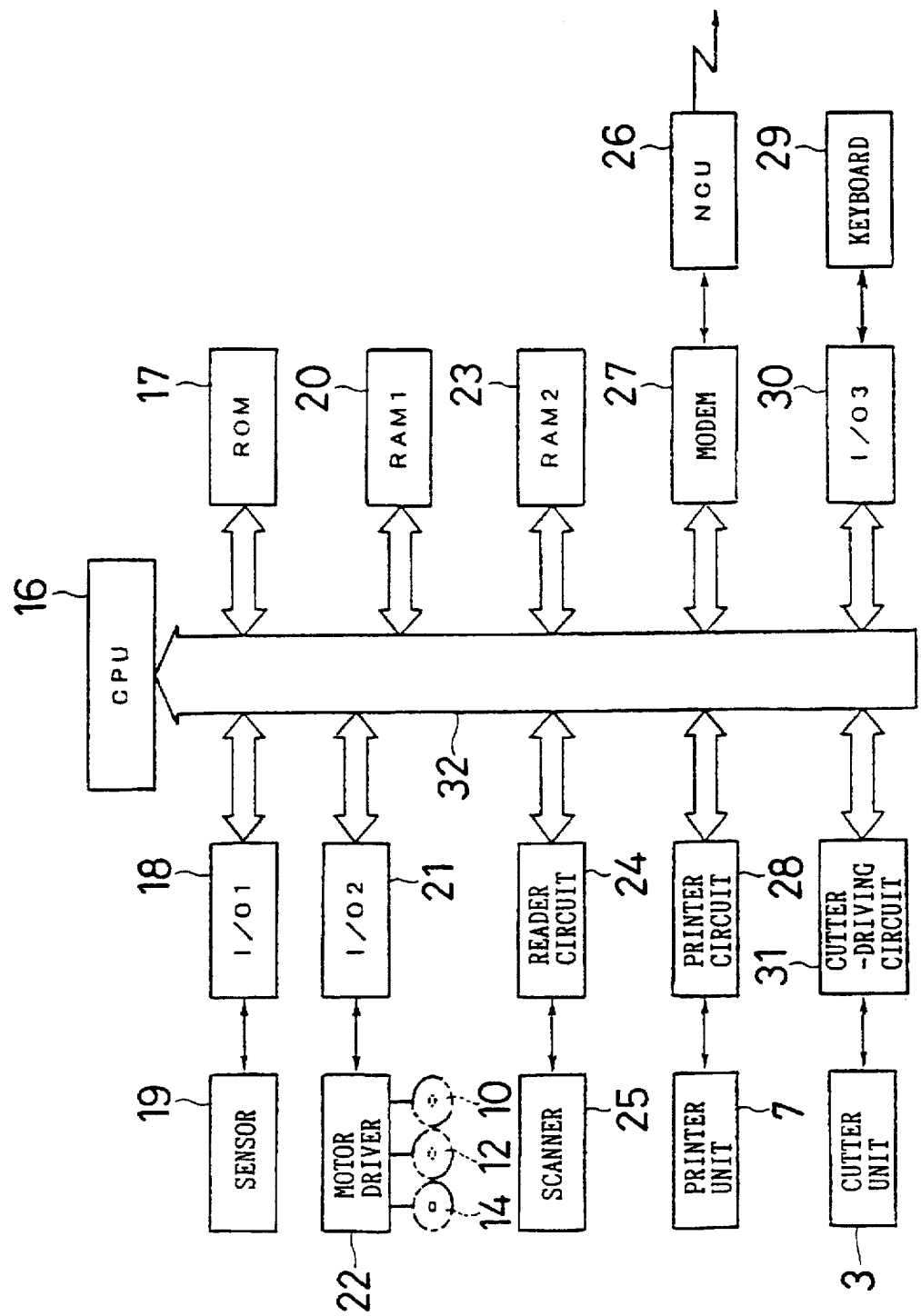
FIG. 1 is a block diagram illustrating the control of the facsimile apparatus according to the present invention.

Now referring to the drawings, preferred embodiments of the invention are described below.

An embodiment of the present invention will now be described with reference to FIG. 1 through FIG. 4.

Figure 2:
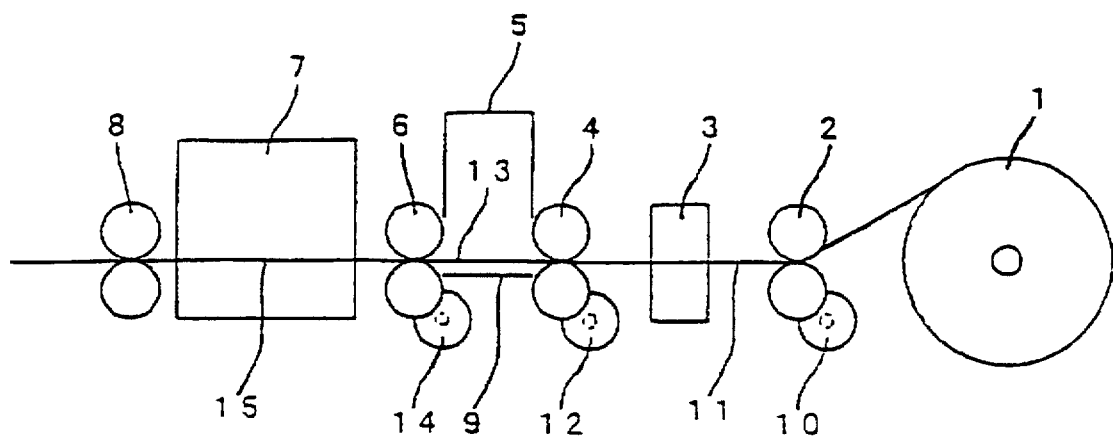
FIG. 2 is a schematic section view illustrative of the printout unit of the facsimile apparatus according to the invention.

FIG. 2 is a schematic view of the printout unit of the facsimile apparatus according to the present invention. Reference numeral 1 indicates ordinary recording paper wound on a roll; the recording paper 1 is forwarded to a printer unit 7 via first paper-forwarding means 2, second paper-forwarding means 4 and third paper-forwarding means 6, and ejected outside from the printer unit 7 via ejecting means 8. Placed between the first paper-forwarding means 2 and the second paper-forwarding means 4 is a cutter unit 3 which forms a cutter path 11. In addition, a bend guard 5 and a bend block 9 for the recording paper are provided between the second paper-forwarding means 4 and the third paper-forwarding means 6 to form a bend path 13. The printer unit 7, which is located between the third paper-forwarding means 6 and the ejecting means 8, forms a print path 15.

In FIG. 1 which is a block diagram illustrating the control of the facsimile apparatus, a CPU 16 which controls the entire apparatus, a ROM 17 which stores a control program, a RAM 120 which stores image data, and a RAM which stores control information, including the number of lines of a single full page of data, are connected to each other via a bus line 32. Connected to the bus line 32 is a modem 27 for controlling communications, which is in turn connected to a telephone line via a NCU 26.

Other members connected to the bus line 32 include a keyboard 29 equipped with a numeric keypad for the operation by the operator, via an I/O3 unit 30; a sensor 19 for detecting the state of each of the units, via an I/O1 unit 18; and a motor driver 22 which controls a stepping motor 10 for driving the first paper-forwarding means 2, a stepping motor 12 for driving the second paper-forwarding means 4 and a stepping motor 14 for driving the third paper-forwarding means 6, via an I/O2 unit 21.

Additional members connected to the bus line 32 include a scanner 25 which reads the document to be copied or reproduced for transmission, via a read circuit 24; a printer circuit 28 for operating the printer unit 7; and a cutter-driving circuit 31 for operating the cutter unit 3.

The CPU 16 includes the capability of counting the number of lines of a single full page of image which is stored in the RAM 223 as well as the capability of controlling the speed of rotation of the paper-forwarding means to cause the recording paper to bend.

An explanation will now be given regarding the bending of the recording paper prior to printing in copy mode, with reference to the control flow chart of FIG. 4.

First, the CPU 16 initiates the operation of the scanner 25 via the read circuit 24 (a). This results in storage of data on the image read in the RAM 120 (b). The CPU, after having detected the completion of the reading of a full page of data (c), counts the number Lv of lines on the one page (d).

The CPU 16 then drives the stepping motors 10, 12 and 14 via the motor driver 22 to rotate the paper-forwarding means 2, 4 and 6, thereby forwarding the recording paper to the front end of the print path (e). Here, the CPU 16 converts the length Lb of the recording paper which has passed through the cutter unit 3, into the number of lines on the basis of the number of rotations of the motors, and the conversion value is stored in the RAM 223.

Figure 3:
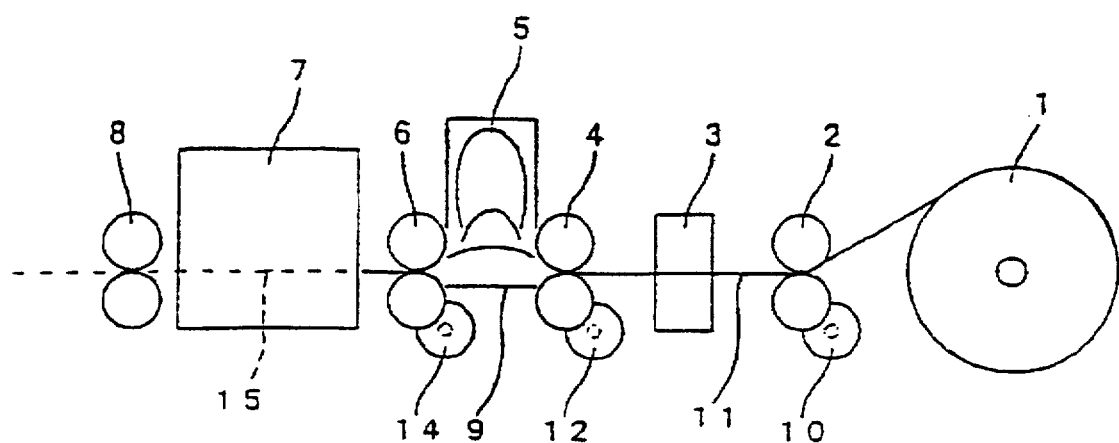
FIG. 3 is an illustration of a bend of recording paper.

The CPU 16 then calculates the number Lp of lines of the recording paper which is forwarded through the printer unit 7 during the time Tc which is required for the cutting operation, according to the equation:

$$Lp = Vp \times Tc$$

wherein Vp is the paper-forwarding speed through the printer unit, and drives the first paper-forwarding means 2 and the second paper-forwarding means 4 while suspending the third paper-fowarding means 6, thereby causing the recording paper to bend along the length equal to Lp (f). Here, the bend guard 5 and the bend block 9 prevent the bend of the recording paper from being brought into contact with the driving units of the apparatus (FIG. 3).

The CPU 16 then initiates the operation of the printer unit 7 through the printer circuit 28, and concurrently drives the stepping motors 10, 12 and 14 via the motor driver 22 to rotate the first paper-forwarding means 2, the second paper-forwarding means 4 and the third paper-fowarding means 6 at the same speed as the paper-forwarding speed Vp of the printer unit to thereby forward the recording paper to the printer unit (g).

After the printing operation has been initiated, the CPU 16 monitors the length Lr of the recording paper which has passed through the cutting position, and when the length Lr is found to have reached the length matching the number Lr of lines which is calculated according to the equation: Lr=Lv-Lb-Lp (h), the stepping motors 10 and 12 are suspended via the motor driver 22. The forwarding of the paper by the first paper-forwarding means 2 and the second paper-forwarding means 4 are suspended in this way, and the cutter unit 3 is then driven through the cutter-driving circuit 31 to cut the recording paper (i), and only the second paper-forwarding means 4 resumes rotation at the speed Vp after the cutting operation has been finished.

Since, the bent portion on the bend path 13 is forwarded even while the forwarding of the paper by the second paper-forwarding means 4 and the other paper-fowarding means located upward therefrom are suspended, the continuous printing operation by the printer unit is not adversely affected.

The printed sheet cut from the recording paper is ejected by the ejecting means 8.

The foregoing operations are repeated for printing on the second and subsequent pages.

Although the foregoing operations are for the case where the recording paper is bent prior to the initiation of the printing operation, the recording paper may be bent even during the printing operation by setting the second paper-fowarding means 4 and the third paper-forwarding means 6 to different paper-forwarding speeds by operating the stepping motors 12 and 14 at different speeds under control of the CPU 16.

The roll of recording paper may be a roll of either light-sensitive recording paper or ordinary recording paper.

Further, the bend guard 5 and the preventing means 9 may be formed of an anti-static resin or metal provided that it prevents the recording paper from electrostatic buildup and thus bending irregularly.

Figure 4:
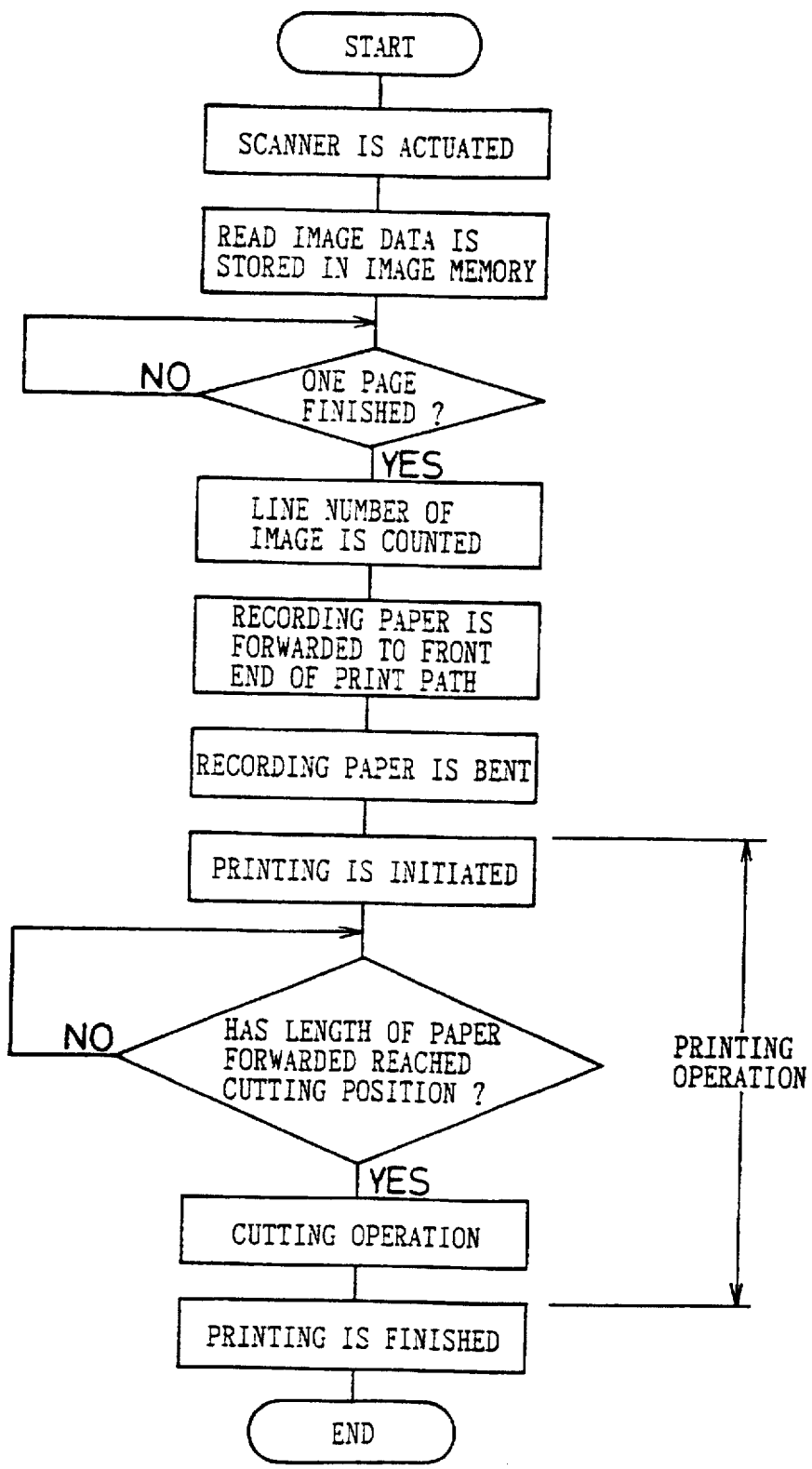
FIG. 4 is a flow chart illustrative of the printing operation of the facsimile apparatus according to the invention.
Figure 5:
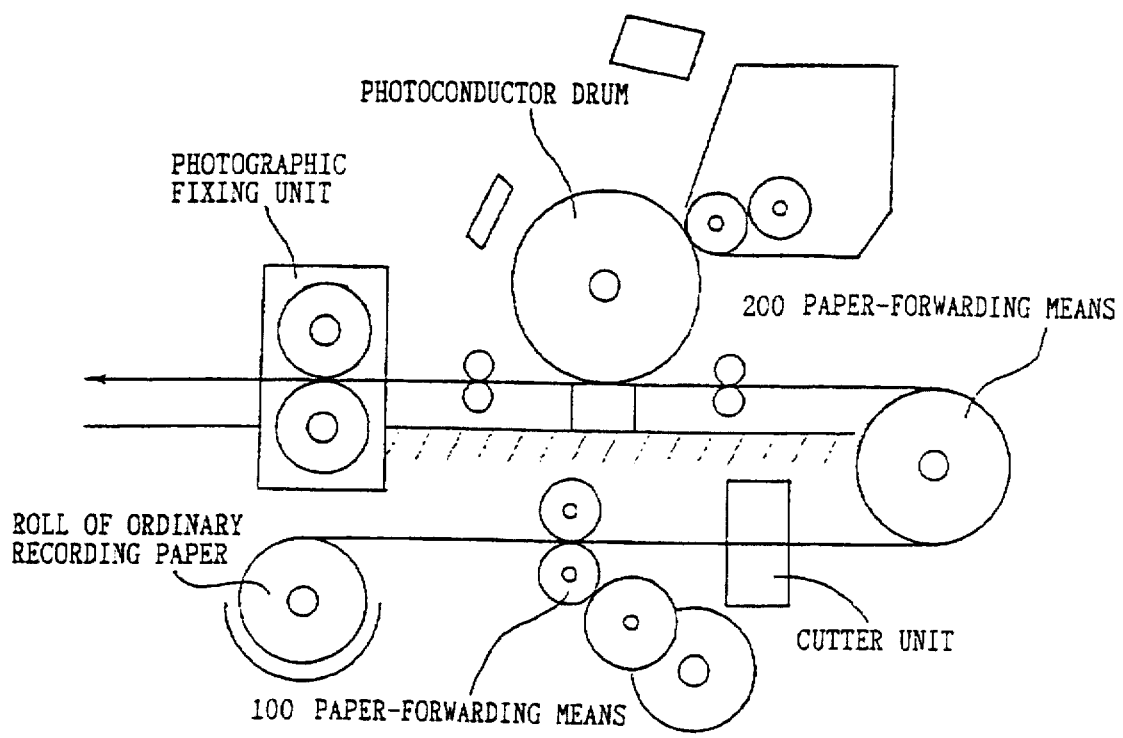
FIG. 5 is a schematic section view illustrative of the printout unit of a facsimile apparatus according to the prior art.

The foregoing description with reference to FIG. 4 is made regarding the operations of reading a document through the reader circuit 24, processing the read data, and storing it in the RAM 120, for copying or transmission. Entirely the same operations are performed for printing out data received by facsimile transmission. More specifically, a receive-processing is initiated, and the received record data is written to the RAM 120 (b). The steps (c) through (j) are then performed.

The present invention allows the recording paper to be cut without suspending the printing operation of the facsimile apparatus, and further allows miniaturization of the apparatus, since the apparatus may operate independently of the size of the document to be reproduced.

In addition, since the printing operation and the cutting operation are carried out simultaneously, no additional time for the cutting operation is required, and this results in a shorter control time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile apparatus comprising:

first detecting means for detecting the number of lines of a single full page of an image to be printed;

storing means for storing the number of lines detected by the first detecting means;

first paper-forwarding means for forwarding a roll of recording paper;

a cutter for cutting the recording paper forwarded by the first paper-forwarding means, along a width thereof;

second and third paper-forwarding means which are located between a printer for printing an image and the cutter, and which are capable of being individually driven;

guarding means for guarding a bent portion of the recording paper;

preventing means for preventing portions of the recording paper other than the bending-allowable portion from bending;

second detecting means for detecting whether the length of the recording paper which has passed the cutter has reached the stored number of lines; and controlling means for causing the recording paper to bend between the cutter and the printer using the first, second and third paper-forwarding means prior to or while printing, suspending the forwarding of the paper to the cutter at the moment the length of the recording paper which has passed the cutter is detected to have reached the length necessary for printing the lines, and cutting the recording paper with the cutter for a shorter time than a time required for printing on the bent portion of the recording paper.

2. The facsimile apparatus according to claim 1, wherein the roll of recording paper is a roll of ordinary recording paper.

3. The facsimile apparatus according to claim 1, wherein the means for guarding the bent portion of the recording paper and the preventing means for preventing portions of the recording paper other than the bending-allowable portion are rendered anti-static.

* * * * *

UNITED STATES PATENT AND TRADEMARK OFFICE
CERTIFICATE OF CORRECTION

PATENT NO. : 5,767,984
DATED : June 16, 1998
INVENTOR(S) : Shinichi Momonami

It is certified that error appears in the above-identified patent and that said letters patent is hereby corrected as shown below:

Item [19] and [75]
On the cover page, change both instances of the inventor's name from "Momonani" to -- Momonami --

Signed and Sealed this

Twenty-fifth Day of August, 1998

Attest:

BRUCE LEHMAN

Attesting Officer

Commissioner of Patents and Trademarks